US008488533B2

(12) United States Patent
Che et al.

(10) Patent No.: US 8,488,533 B2
(45) Date of Patent: Jul. 16, 2013

(54) METHOD AND APPARATUS FOR PROVIDING ACKNOWLEDGMENT BUNDLING

(75) Inventors: Xiangguang Che, Beijing (CN); Peng Chen, Beijing (CN); Frank Frederiksen, Klarup (DK); Troels Kolding, Klarup (DK)

(73) Assignee: Nokia Corporation, Espoo (FI)

( * ) Notice: Subject to any disclaimer, the term of this patent is extended or adjusted under 35 U.S.C. 154(b) by 606 days.

(21) Appl. No.: 12/489,988

(22) Filed: Jun. 23, 2009

(65) Prior Publication Data
US 2009/0323617 A1 Dec. 31, 2009

Related U.S. Application Data

(60) Provisional application No. 61/074,923, filed on Jun. 23, 2008.

(51) Int. Cl.
*H04W 72/12* (2009.01)
(52) U.S. Cl.
USPC ............ 370/329; 370/342; 370/431; 370/442
(58) Field of Classification Search
None
See application file for complete search history.

(56) References Cited

U.S. PATENT DOCUMENTS

| | | | | | |
|---|---|---|---|---|---|
| 5,499,243 | A | * | 3/1996 | Hall .............................. | 370/346 |
| 2008/0051087 | A1 | * | 2/2008 | Ryu et al. ...................... | 455/436 |
| 2008/0084873 | A1 | | 4/2008 | Pullen et al. .................. | 370/352 |
| 2008/0273513 | A1 | * | 11/2008 | Montojo et al. .............. | 370/342 |
| 2009/0279565 | A1 | * | 11/2009 | Kamath et al. ................ | 370/442 |
| 2011/0194521 | A1 | * | 8/2011 | Fan et al. ...................... | 370/329 |

OTHER PUBLICATIONS

3GPP TR 23.882 V1.15.0, "3rd Generation Partnership Project; Technical Specification Group Services and System Aspects; 3GPP System Architecture Evolution: Report on Technical Options and Conclusions (Release 7)", Feb. 2008, 123 pages.
3GPP TR 25.813 V7.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", Sep. 2006, 41 pages.
3GPP TR 25.814 V1.5.0, "Physical Layer Aspects for Evolved UTRA (Release 7)", May 2006, 125 pages.
3GPP TS 36.300 V8.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2008, 126 pages.
3GPP TSG RAN WG1 #52bis, R1-081373, "Explicit DTX Signaling with ACK/NAK Bundling in TDD", Shenzhen, China, Mar. 31-Apr. 4, 2008, 4 pages.
3GPP TSG RAN WG1 Meeting #53bis, R1-082615, "DAI Design for TDD configuration #5 (9:1) in ACK/NACK Bundling", Warzaw, Poland, Jun. 30-Jul. 4, 2008, 7 pages.
International Search Report and Written Opinion of International Application No. PCT/EP2009/057844 dated Nov. 13, 2009, pp. 1-12.
Office Action for Chinese Patent Application No. 200980123798.6, dated Jun. 23, 2009, pp. 1-20.

* cited by examiner

*Primary Examiner* — Chi H. Pham
*Assistant Examiner* — Shick Hom
(74) *Attorney, Agent, or Firm* — Ditthavong Mori & Steiner, P.C.

(57) ABSTRACT

An approach is provided for acknowledgement bundling. Dynamically scheduling of one or more of subframes per bundling window is performed by reusing an assignment index field (e.g., downlink assignment index (DAI) field). The assignment index field has a value greater than or equal to number of previously assigned subframes within the bundling window. The bundling window defines a group of subframes for common acknowledgement.

10 Claims, 12 Drawing Sheets

METHOD AND APPARATUS FOR PROVIDING ACKNOWLEDGMENT BUNDLING

RELATED APPLICATIONS

This application claims the benefit of the earlier filing date under 35 U.S.C. §119(e) of U.S. Provisional Application Ser. No. 61/074,923 filed Jun. 23, 2008, entitled "Method and Apparatus for Providing Acknowledgement Bundling," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves acknowledgment signaling, whereby transmissions can be implicitly or explicitly acknowledged to convey successful transmission of data. An inefficient acknowledgement scheme can unnecessarily consume network resources.

Therefore, there is a need for an approach for providing efficient signaling, which can co-exist with already developed standards and protocols.

Some Exemplary Embodiments

According to certain exemplary embodiment, acknowledgement bundling can be provided for various communication link (e.g., uplink/downlink (UL/DL)) configurations by reusing a Downlink Assignment Index (DAI) field without increasing the length of DAI field.

According to one embodiment, a method comprises dynamically scheduling one or more of subframes per bundling window by reusing an assignment index field. The assignment index field has a value greater than or equal to number of previously assigned subframes within the bundling window. The bundling window defines a group of subframes for common acknowledgement.

According to another embodiment, an apparatus comprises logic configured to dynamically schedule one or more of subframes per bundling window by reusing an assignment index field. The assignment index field has a value greater than or equal to number of previously assigned subframes within the bundling window. The bundling window defines a group of subframes for common acknowledgement.

According to another embodiment, an apparatus comprises means for dynamically scheduling one or more of subframes per bundling window by reusing an assignment index field. The assignment index field has a value greater than or equal to number of previously assigned subframes within the bundling window. The bundling window defines a group of subframes for common acknowledgement.

According to another embodiment, a method comprises determining total number of resource grants. The method also comprises determining whether one or more resource grants have been missed by comparing a value of an assignment index field of a received bundling window with the total number of resource grants. The assignment index field is reused for dynamic scheduling of resources using a bundling window. The bundling window defines a group of subframes for common acknowledgement.

According to another embodiment, an apparatus comprises logic configured to logic configured to determine total number of resource grants and whether one or more resource grants have been missed by comparing a value of an assignment index field of a received bundling window with the total number of resource grants. The assignment index field is reused for dynamic scheduling of resources using a bundling window. The bundling window defines a group of subframes for common acknowledgement.

According to yet another embodiment, an apparatus comprises means for determining total number of resource grants. The method also comprises determining whether one or more resource grants have been missed by comparing a value of an assignment index field of a received bundling window with the total number of resource grants. The assignment index field is reused for dynamic scheduling of resources using a bundling window. The bundling window defines a group of subframes for common acknowledgement.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

An apparatus, method, and software for acknowledgement bundling are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1A:
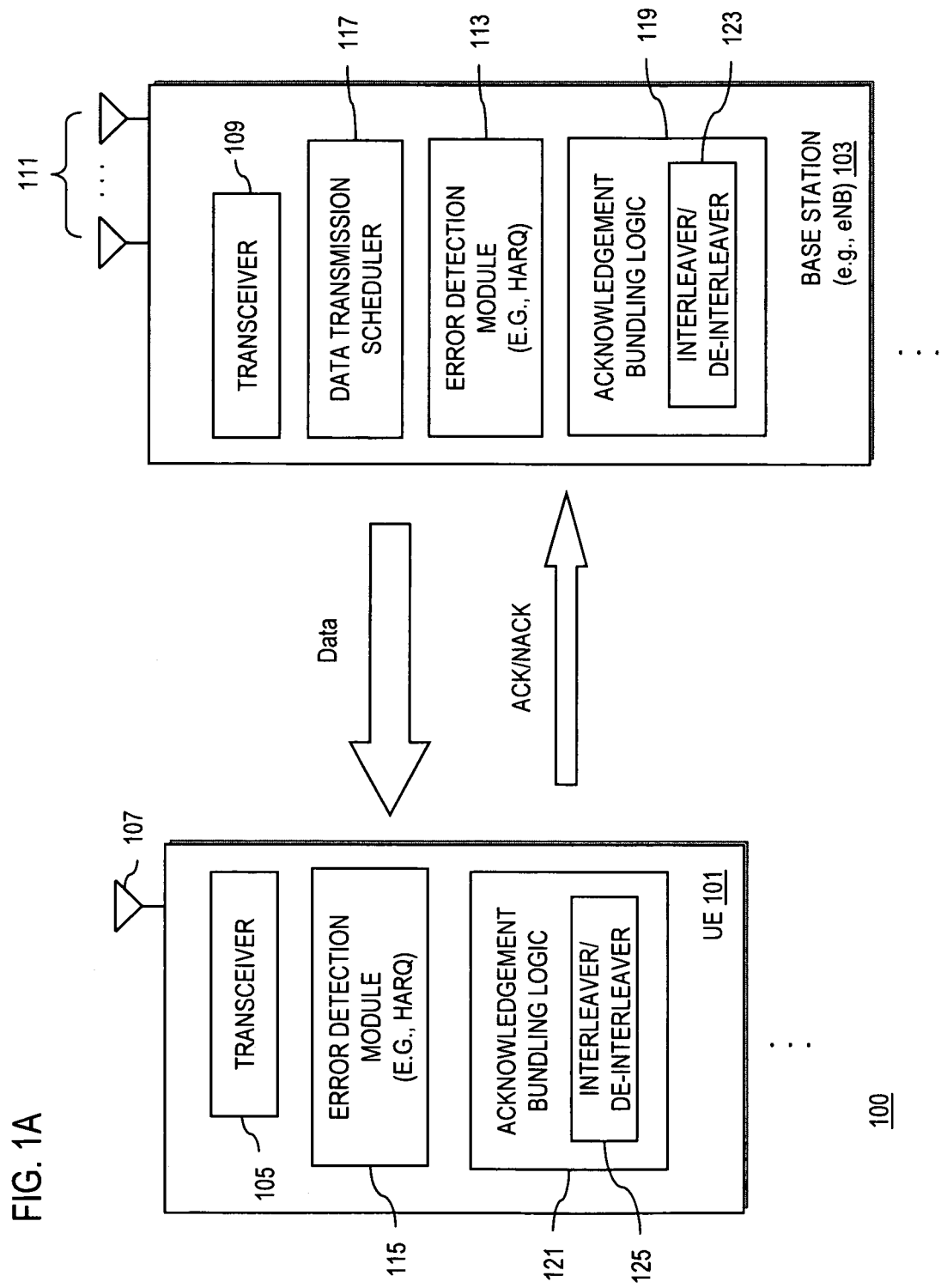
FIGS. 1A and 1B are, respectively, a diagram of a communication system capable of providing acknowledgement bundling, and a flowchart of the acknowledgement bundling process, according to an exemplary embodiment.
Figure 1B:
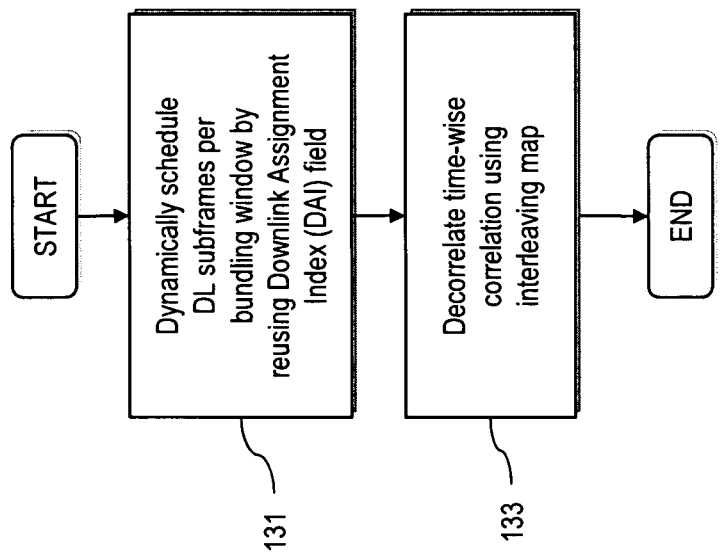

FIGS. 1A and 1B are, respectively, a diagram of a communication system capable of providing acknowledgement bundling, and a flowchart of the acknowledgement bundling process, according to an exemplary embodiment. As shown in FIG. 1A, system 100 includes one or more user equipment (UEs) 101 communicating with a base station 103, which is part of an access network (not shown) (e.g., 3GPP LTE (or E-UTRAN, etc.). Under the 3GPP LTE architecture (as shown in FIGS. 4A-4D), the base station 103 is denoted as an enhanced Node B (eNB). The system 100, in certain embodiments, utilize an acknowledgement mechanism to provide accurate and timely exchange of information between the UE 101 and the eNB 103. However, such acknowledgement signaling (i.e., using positive acknowledgements (ACKs) and/or negative acknowledgements (NACKs)) is overhead, and if not utilized properly can result in degraded network performance. To minimize signaling overhead, system 100 employs a scheme to bundle acknowledgement information. In one embodiment, dynamic scheduling of subframes per bundling window is implemented by reusing, for example, a downlink assignment index (DAI) field. Although the bundled acknowledgement scheme is explained with respect to the DAI field and downlink, it is contemplated that such scheme can be applied to other equivalent fields and communication link. As used herein, downlink refers to communication in the direction from the eNB 103 to the UE 101, and uplink refers to communication from the UE 101 to the eNB 103.

The UE 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UE 101 includes a transceiver 105 and an antenna system 107 that couples to the transceiver 105 to receive or transmit signals from the base station 103. The antenna system 107 can include one or more antennas. For the purposes of illustration, the time division duplex (TDD) mode of 3GPP is described herein; however, it is recognized that other modes can be supported, e.g., frequency division duplex (FDD).

As with the UE 101, the base station 103 employs a transceiver 109, which transmits information to the UE 101. Also, the base station 103 can employ one or more antennas 111 for transmitting and receiving electromagnetic signals. For instance, the Node B 103 may utilize a Multiple Input Multiple Output (MIMO) antenna system 111, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v. 1.5.0, May 2006 (which is incorporated herein by reference in its entirety). SC-FDMA, also referred to as Multi-User-SC-FDMA, allows multiple users to transmit simultaneously on different sub-bands.

In one embodiment, the system of FIG. 1A provides MBMS (Multimedia Broadcast Multicast Services) services in a MBSFN (Multimedia Broadcast Single Frequency Network). An MBSFN typically has other neighboring MBSFNs or unicast networks operating at the same frequency.

Communications between the UE 101 and the base station 103 (and thus, the network) is governed, in part, by control information exchanged between the two entities. Such control information, in an exemplary embodiment, is transported over a control channel on, for example, the downlink from the base station 103 to the UE 101.

By way of example, a number of communication channels are defined for use in the system 100. The channel types include: physical channels, transport channels, and logical channels. Physical channels can include a physical downlink shared channel (PDSCH), a dedicated physical downlink dedicated channel (DPDCH), a dedicated physical control channel (DPCCH), etc. Additional, a Physical Uplink Control Channel (PUCCH) is provided. The transport channels can be defined by how they transfer data over the radio interface and the characteristics of the data. The transport channels include a broadcast channel (BCH), paging channel (PCH), a dedicated shared channel (DSCH), etc. Other exemplary transport channels are an uplink (UL) Random Access Channel (RACH), Common Packet Channel (CPCH), Forward Access Channel (FACH), Downlink Shared Channel (DLSCH), Uplink Shared Channel (USCH), Broadcast Channel (BCH), and Paging Channel (PCH). A dedicated transport channel is the UL/DL Dedicated Channel (DCH). Each transport channel is mapped to one or more physical channels according to its physical characteristics.

Each logical channel can be defined by the type and required Quality of Service (QoS) of information that it carries. The associated logical channels include, for example, a broadcast control channel (BCCH), a paging control channel (PCCH), Dedicated Control Channel (DCCH), Common Control Channel (CCCH), Shared Channel Control Channel (SHCCH), Dedicated Traffic Channel (DTCH), Common Traffic Channel (CTCH), etc.

The BCCH (Broadcast Control Channel) can be mapped onto both BCH and DSCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identities) is used to identify the resource allocation information.

As noted, to ensure accurate delivery of information between the eNB 103 and the UE 101, the system 100 utilizes error detection to exchange information, e.g., Hybrid ARQ (HARQ). HARQ is a concatenation of Forward Error Correction (FEC) coding and an Automatic Repeat Request (ARQ) protocol. Automatic Repeat Request (ARQ) is an error detection mechanism used on the link layer. As such, this error detection scheme, as well as other schemes (e.g., CRC (cyclic redundancy check)), can be performed by error detection modules 113 and 115 within the eNB 103 and UE 101, respectively. The HARQ mechanism permits the receiver (e.g., UE 101) to indicate to the transmitter (e.g., eNB 103)

that a packet or sub-packet has been received incorrectly, and thus, requests the transmitter to resend the particular packet(s).

According to one embodiment, downlink hybrid-ARQ acknowledgements in TDD can be transmitted as a single ACK/NACK feedback where ACK/NACKs from one or several DL subframes are combined ("bundled" by performing AND operation of all A/N) to a single ACK/NACK report and the Physical Uplink Control Channel (PUCCH) formats already defined for LTE are reused (PUCCH Format 1a/1b). This ACK/NACK mode is referred to as "AN-bundling." For example, with respect to AN bundling for UL/DL configurations (except configuration 5), one implementation is to employ a Downlink Assignment Index (DAI) field (e.g. 2-bit), which is added to DCI formats 1, 1A, 1B, and 2. For example, ACK or NACK feedback can be provided from scheduled DL subframes in which the DAI value of a prior assignment can be compared with a latest assignment to determine any missed assignments.

In certain embodiments, the downlink assignment index must be greater than or equal to the number of previously assigned subframes within the bundling window and must be less or equal to the maximum number of dynamic assignments within the bundling window. The ULE 101 can use the CCE index in last received/detected dynamic DL assignment as well as the subframe number to (i) check for missed DL assignments and (ii) determine the UL ACK/NACK PUCCH index. Further, it is assumed that semi-persistent assignments are not counted in the downlink assignment index.

It is recognized that the DAI field is constrained, for example, by 2-bits; however, there are up to 9 DL subframes during one bundling window which can be dynamically scheduled. Thus 2-bits cannot fully cover 1-9 DL subframes per bundling window.

To better appreciate the bundling approach of certain embodiments, it is instructive to describe the following three conventional mechanisms: options 1-3.

In option 1, the two DAI bits indicate if it is the only, first, last, or neither first nor last dynamically assigned DL subframe within the bundling window. The UE can assume that the assigned subframes are consecutive. The drawback of this option is that it enforces only consecutive time domain scheduling, which is greatly limiting the packet scheduler's flexibility in the packet oriented wireless access system. Thus, performance is degraded, and complexity is increased. Furthermore, this is in contradiction with the scheme agreed for other UL/DL configurations.

With option 2, partial sub-frame bundling and ACK/NACK multiplexing scheme is used. The 9 DL sub-frames (including DwPTS) are assigned to X (X>1) bundling windows. For each bundling window, at most 8 ACK/NACK bits can be bundled together regardless of whether it is single codeword or not. ACK/NACK multiplexing scheme is used to transmit multiple ACK/NACK bits corresponding to each bundling window. A drawback of this approach is that it is not a true AN-bundling scheme, but is a multi-bits scheme—which means that it does not provide an AN-bundling solution for 9DL:1UL configuration.

With option 3, an eNB can dynamically schedule at most 4 downlink subframes to a UE within the bundling window. Remaining downlink resources (if they exist) can be covered by semi-persistent or multi-cast assignment. MBSFN subframes can further reduce the unicast downlink subframes in a bundling window. The drawback is that scheduler cannot fully exploit the performance gain from dynamic scheduling for all 9 DL subframes. Also, it is expected that performance degradation is incurred with semi-persistent scheduling due to limited/none frequency selective gain and low efficiency of resource utilization because resources are pre-allocated for each users and can be re-allocated only every rather long time, e.g., a few seconds or even longer.

As shown in FIG. 1B, the approach of system 100 permits a scheduler 117 full flexibility to dynamically, as in step 131, schedule any of the, e.g., 9 DL subframes per bundling window by reusing the agreed 2-bits DAI for other UL/DL configurations (i.e., not increase the length of DAI). Additionally, from the UE 101 perspective, such mechanism should be simple to adopt. Further, interleaving is employed to decorrelate time-wise correlations associated with the bundling mechanism (step 133). This process, in an exemplary embodiment, is performed by the eNB 103 in conjunction with the UE 101 using corresponding acknowledgement bundling logic 119, 121. Further, each of the acknowledgement bundling logic 119, 121 can employ an interleaver/deinterleaver 123, 125.

Two approaches are provided: Method 1 and Method 2, as shown respectively in FIGS. 2A-2C and 3A and 3B. Under Method 1 (detailed in FIGS. 2A-2C), wrap-around the number of scheduler DL subframe into 2-bits DAI, and this value is updated every scheduled subframe. With Method 2 (detailed in FIGS. 3A and 3B), the process uses (Ceil (Counter/2)+K) modulo 4, where K is a boolean value to indicate whether at least 2 subframes will be dynamically assigned in the subframes within the bundling window. In other words, if there are 0 or 1 subframes that will be dynamic assigned in the following subframes within the bundling window, K=0; otherwise, K=1. Counter is the number of scheduler DL subframes and is updated every subframe.

According to certain embodiments, these processes can incorporate an interleaving method, which introduces a time-wise decorrelation of the consecutive PDCCHs received. When interleaving, the interleaver map will break the regular pattern of the potential correlated PDCCH errors.

Figure 2B:
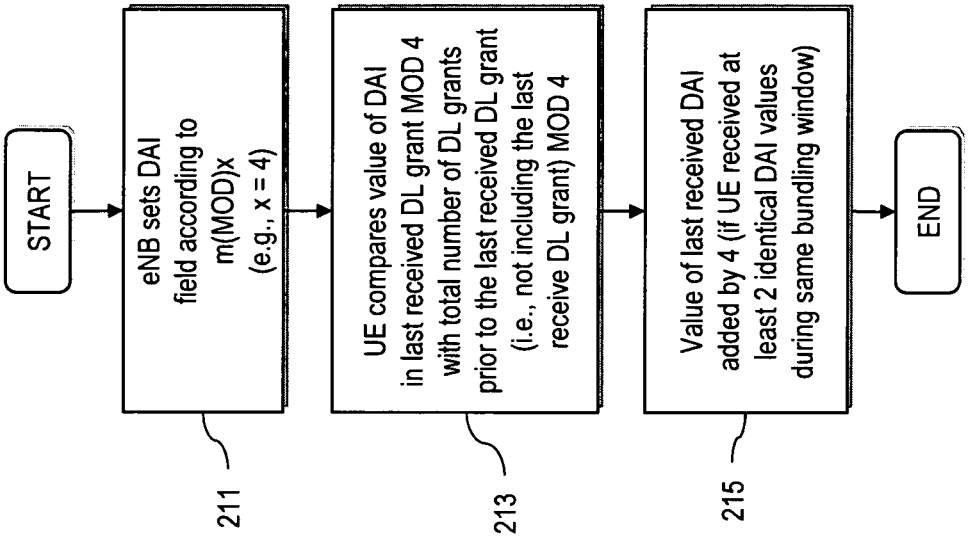
FIGS. 2A-2C are, correspondingly, flowcharts of a process for reusing a downlink assignment index (DAI) field, and a diagram of exemplary downlink bundle windows, according to various exemplary embodiments.
Figure 2A:
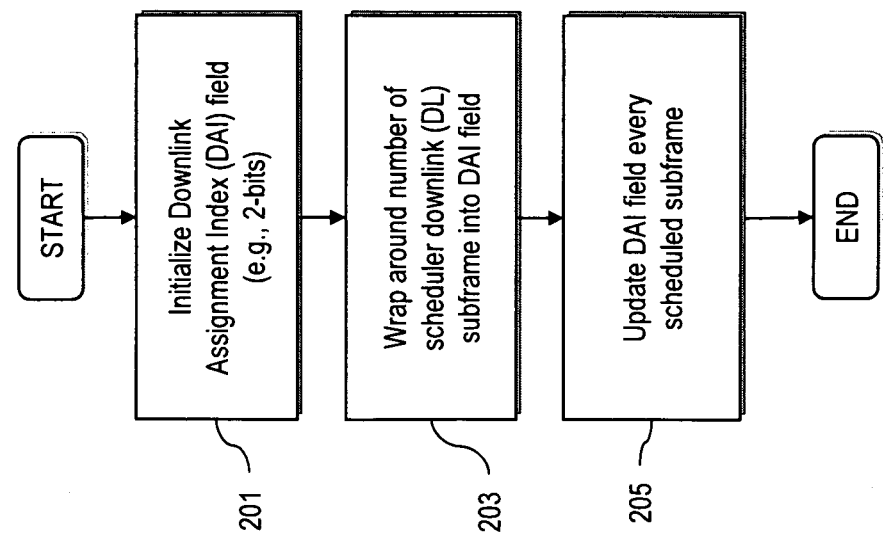
Figure 2C:
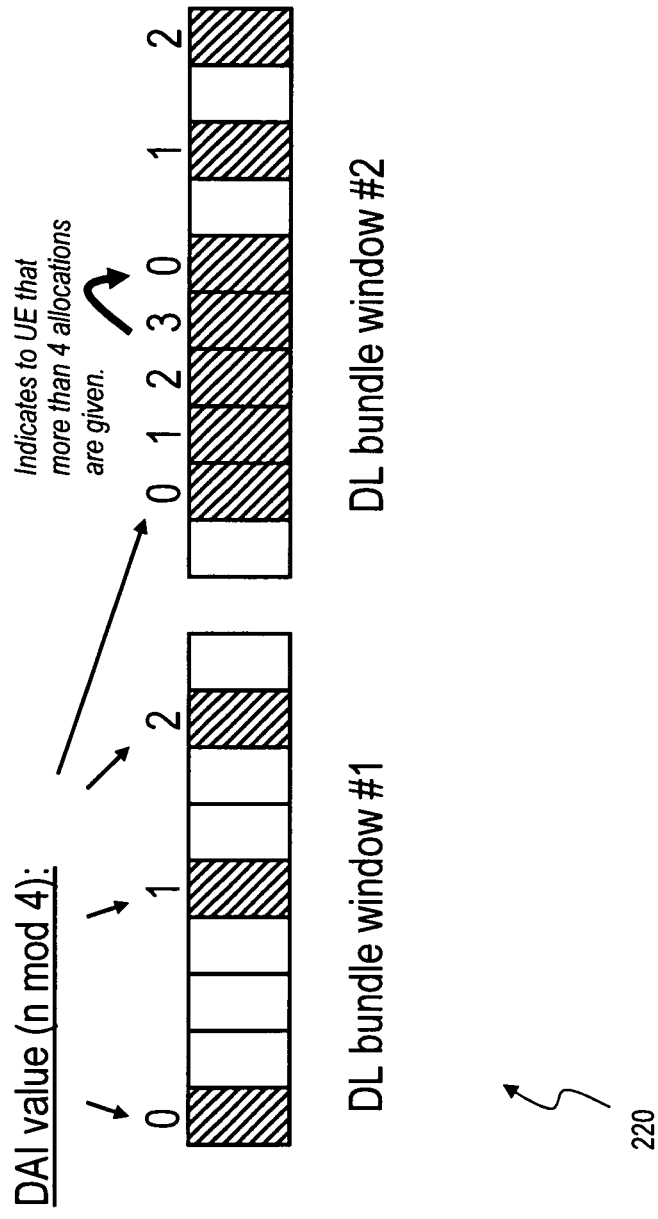

FIGS. 2A-2C are, correspondingly, flowcharts of a process for reusing a downlink assignment index (DAI) field, and a diagram of exemplary downlink bundle windows, according to various exemplary embodiments. In this embodiment of Method 1 (as shown in FIG. 2A), a simple extension from the DAI definition can be made for other UL/DL configurations. In step 201, the process initializes the DAI field. Next, the number of scheduler downlink (DL) subframe is wrapped around into the DAI field, as in step 203. A counter 'm' is utilized to count the number of scheduled DL subframe; and 'm' is updated in each subframe. That is, the DAI field is updated in every scheduled subframe, as in step 205.

Thus, from the eNB side (as seen in FIG. 2B), in step 211, the DAI field is set according to m (modulo) x (where m and x are integers); for example, m MOD 4. From the ULE side, the ULE 101 will compare, per step 213, the value of DAI in the last received DL grant MOD 4 with the total received number of DL grant prior to the last received DL grant (i.e. not including the last receive DL grant) MOD 4 during the bundling window to detect whether some grant(s) have been missed, and AN or DTX (data transmission) will be sent, if the comparison is equal or non-equal, respectively. If UE 101 has received at least 2 of the same (identical) DAI values during the same bundling window, the value of the last received DAI should be added '4' (step 215).

FIG. 2C shows an example of DL bundle windows 220, in which bundle window #1 specifies DAI values corresponding to subframes 1, 5, and 8. That is, 3 assignments are provided. Bundle window # 2 provides DAI values corresponding to subframes 2-6, 7, and 9; i.e., 6 assignments.

The above process, according to certain embodiments, provides a relatively simple method for accommodating other UL/DL configuration, and can readily to be added on top the AN bundling for all other configurations (from both standards and implementation point of view). Additionally, there is no restriction imposed on the scheduler 117.

It is noted that a DTX->ACK problem may occur if UE missed 4 consecutive DL grants, for instance. Although the probability of such case is rather low in practice, the eNB 103 can "fall-back" to the conventional option-3 (as explained earlier) freely and dynamically to completely avoid such error case if the eNB 103 foresees that this error may occur and the performance loss is "unacceptable". That is, this approach provides for "free & dynamic switch" between Method-1 and Option-3.

Figure 3A:
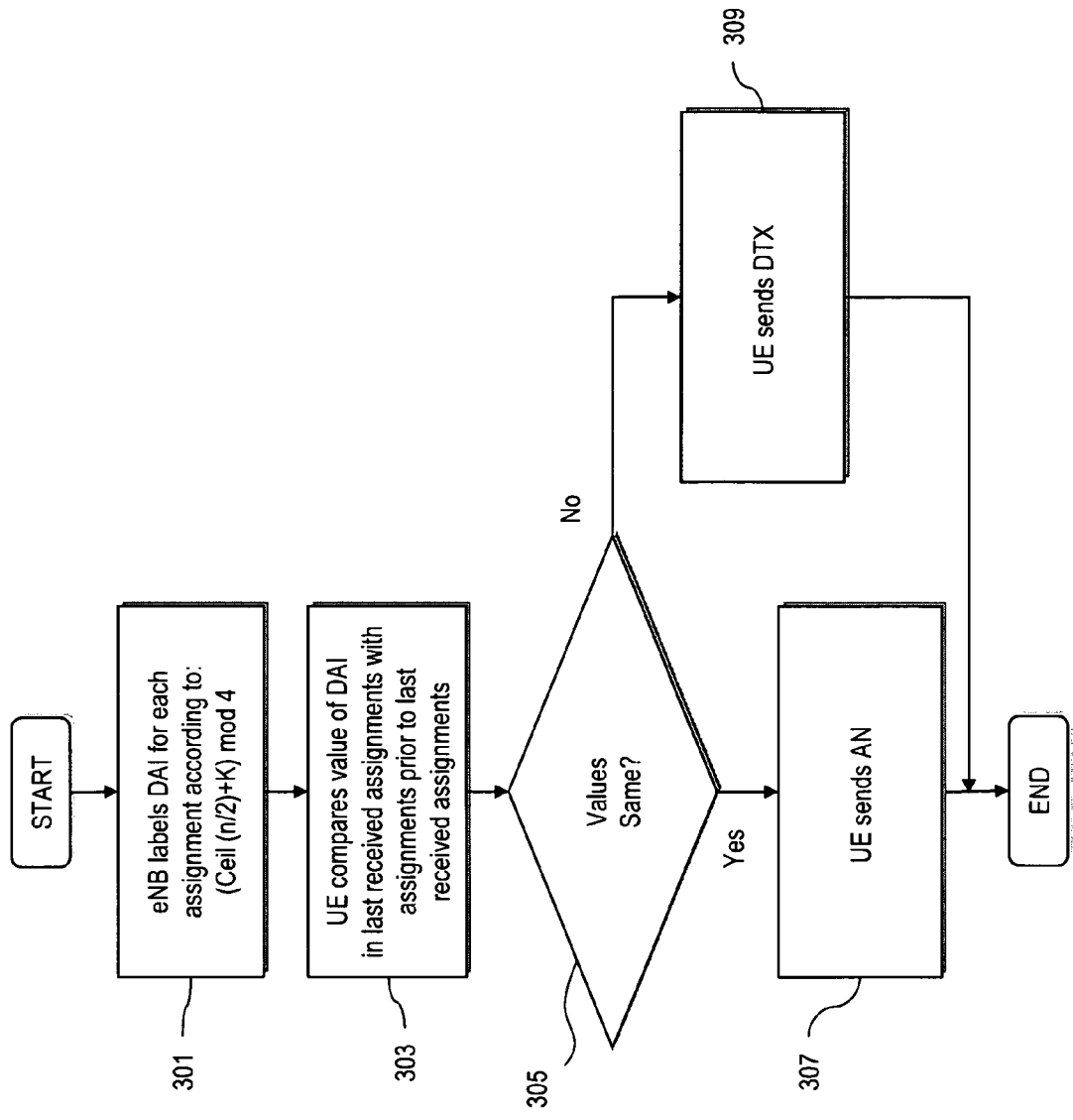
FIGS. 3A and 3B are, respectively, a flowchart of a process for reusing a downlink assignment index (DAI) field, and a diagram of exemplary assignments within a bundle window, according to various exemplary embodiments.
Figure 3B:
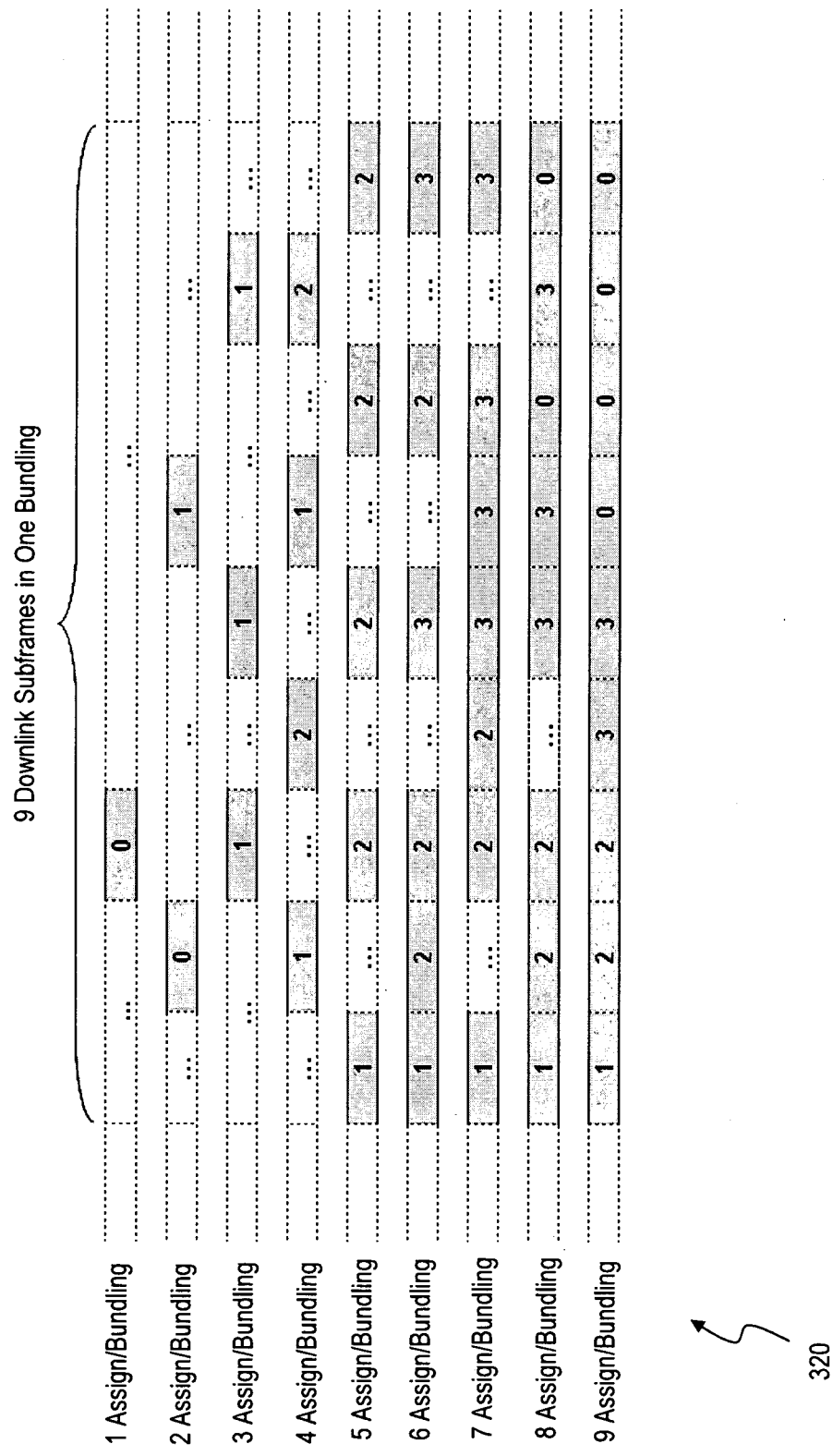

FIGS. 3A and 3B are, respectively, a flowchart of a process for reusing a downlink assignment index (DAI) field, and a diagram of exemplary assignments within a bundle window, according to various exemplary embodiments. In this embodiment, the eNB 103 labels, as in step 301, DAI for each assignment as follows: (Ceil (n/2)+K) mod 4, where n is the number of previous scheduled assignments within the bundling window, and K (as previously stated) is a boolean value to indicate 0/1 subframe (K=0) or at least 2 subframes (K=1) will be scheduled in following subframes within the bundling window.

In step 303, the UE 101 compares two values: sum_DAI_2 last_received assignments mod 4 and number_of_assignments_before_last_received_assignment mod 4. If two values are the same (as determined in step 305), the UE 101 will send AN (step 307). Otherwise, the UE 101 sends DTX, per step 309.

FIG. 3B shows an example of the various assignments 320 within a single bundle. In this example, 9 downlink subframes can provided within one bundle.

The above process, according to certain embodiments, imposes no restriction on the scheduler 117. Also, there is no error case or false error probability. It is noted that the eNB 103 has to "pre-estimate" the scheduling decision at least 2 subframe ahead. This, if compared with conventional option-3, is less restrictive requirement since semi-persistent scheduling for 5 subframes actually mean that eNB 103 should do "pre-estimate" the scheduling decision much longer than 2 subframe ahead.

As mentioned an interleaving process can be employed with the processes of FIGS. 2A-2C and 3A and 3B. Specifically, an interleaver map provides decorrelation of time-wise correlations. In one example, a block interleaver with 5 columns and 2 rows can be utilized (e.g., for interleavers 123, 125). When inserting the data into the interleaver 125, data is written row-by-row, while the output is read column-by-column. To ensure maximum decorrelation, the first element of the interleaver matrix is filled with a "dummy" value, which is ignored when reading from the matrix. The reason for this being that typically for this TDD configuration there are 9 PDCCHs that are to be transmitted. Essentially, using this interleaver map, the sequence: {1,2,3,4,5,6,7,8,9} can be mapped into the sequence {5,1,6,2,7,3,8,4,9}, where it is seen that the distance between consecutive PDCCH "counters" will be 4 or 5 depending on the time of observation. It is noted that introducing such an interleaver element yields the need to perform scheduling decisions 5 subframes ahead (since the DAI signaling value of subframe 5 needs to be transmitted in subframe 1 due to the interleaver). With time-wise decorrelation, the false-positive probability will become lower. It is noted that with the use of interleaving, there may be a need for a pre-estimation of up to 5 subframes, thereby requiring some scheduling ahead (the exact value in subframe 5 needs signaling, so the decisions in subframes 1-4 are also needed).

In certain embodiments, the processes described above can be performed within an UMTS terrestrial radio access network (UTRAN) or Evolved UTRAN (E-UTRAN) in 3GPP, as next described.

FIGS. 4A-4D are diagrams of communication systems having exemplary long-term evolution (LTE) architectures, in which the user equipment (UE) and the base station of FIG. 1A can operate, according to various exemplary embodiments of the invention. By way of example (shown in FIG. 4A), a base station (e.g., destination node) and a user equipment (UE) (e.g., source node) can communicate in system 400 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 4A:
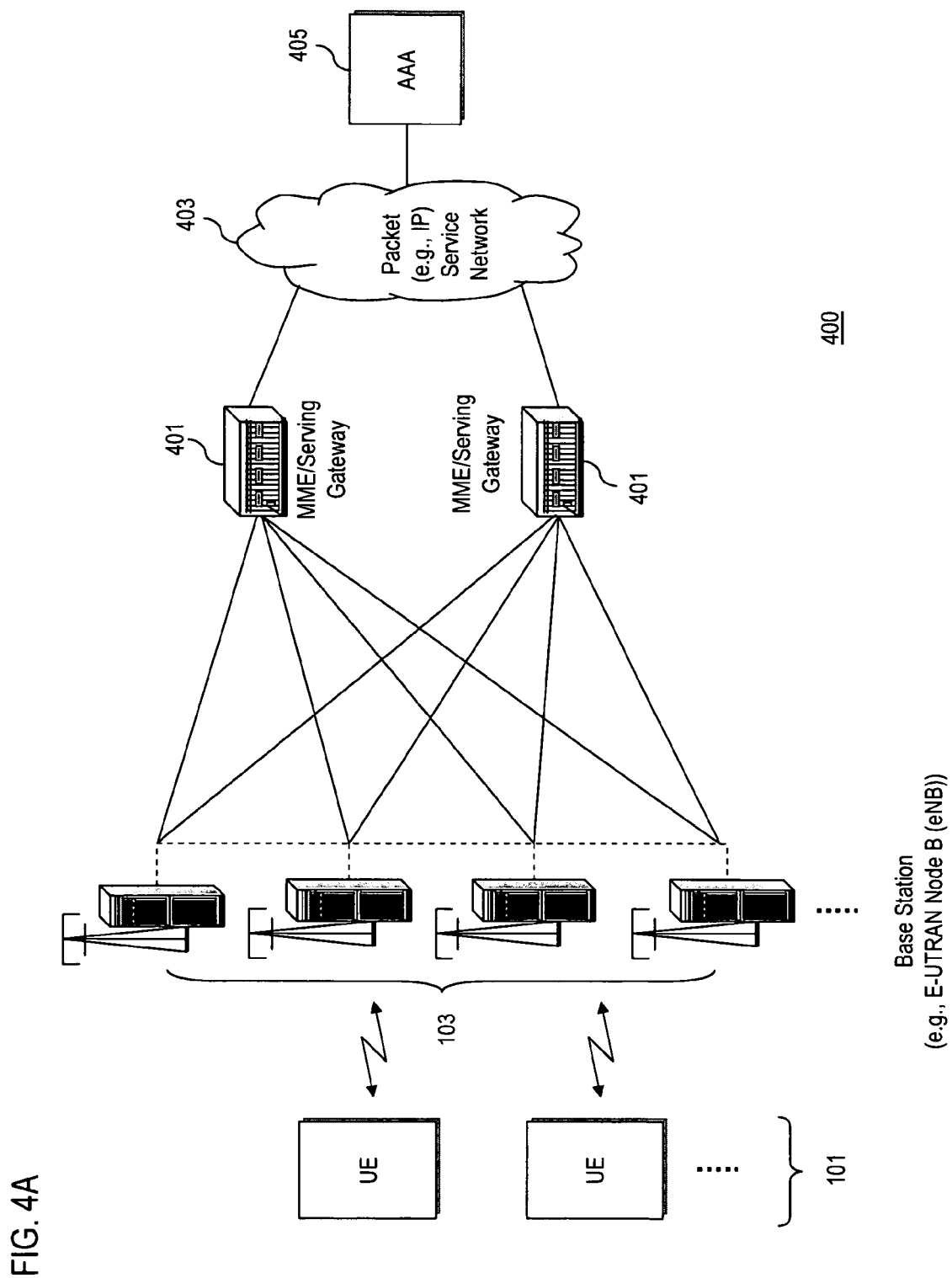
FIGS. 4A-4D are diagrams of communication systems having exemplary long-term evolution (LTE) and E-UTRA (Evolved Universal Terrestrial Radio Access) architectures, in which the system of FIG. 1 can operate to provide resource allocation, according to various exemplary embodiments of the invention.

The communication system 400 is compliant with 3GPP LTE, entitled "Long Term Evolution of the 3GPP Radio Technology" (which is incorporated herein by reference in its entirety). As shown in FIG. 4A, one or more user equipment (UEs) communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 401 are connected to the eNBs 103 in a full or partial mesh configuration using tunneling over a packet transport network (e.g., Internet Protocol (IP) network) 403. Exemplary functions of the MME/Serving GW 401 include distribution of paging messages to the eNBs 103, termination of U-plane packets for paging reasons, and switching of U-plane for support of UE mobility. Since the GWs 401 serve as a gateway to external networks, e.g., the Internet or private networks 403, the GWs 401 include an Access, Authorization and Accounting system (AAA) 405 to securely determine the identity and privileges of a user and to track each user's activities. Namely, the MME Serving Gateway 401 is the key control-node for the LTE access-network and is responsible for idle mode UE tracking and paging procedure including retransmissions. Also, the MME 401 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 4B:
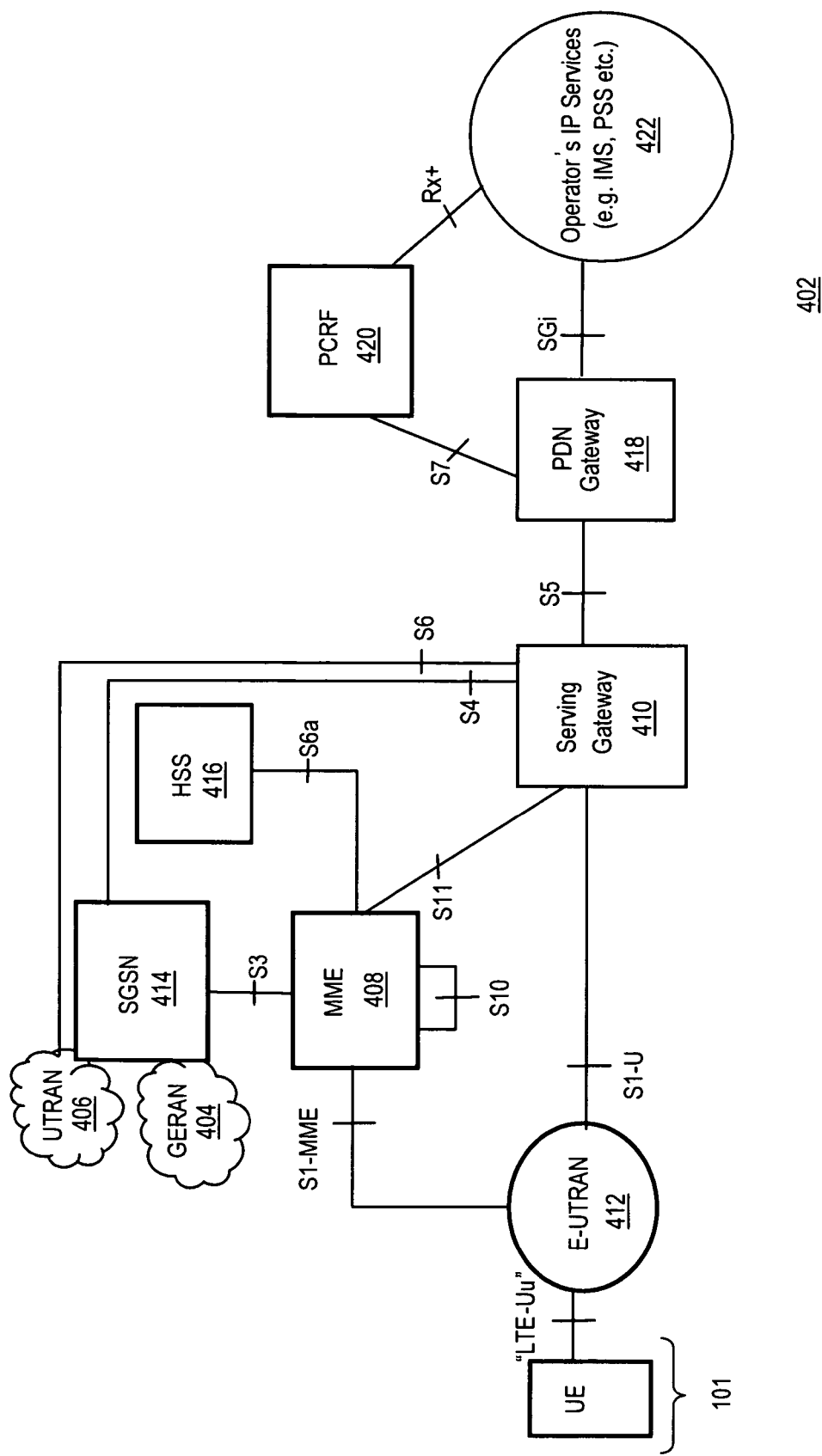

In FIG. 4B, a communication system 402 supports GERAN (GSM/EDGE radio access) 404, and UTRAN 406 based access networks, E-UTRAN 412 and non-3GPP (not shown) based access networks, and is more fully described in TR 23.882, which is incorporated herein by reference in its entirety. A key feature of this system is the separation of the network entity that performs control-plane functionality (MME 408) from the network entity that performs bearer-plane functionality (Serving Gateway 410) with a well defined open interface between them S11. Since E-UTRAN 412 provides higher bandwidths to enable new services as well as to improve existing ones, separation of MME 408 from Serving Gateway 410 implies that Serving Gateway 410 can be based on a platform optimized for signaling transactions. This scheme enables selection of more cost-effective platforms for, as well as independent scaling of, each of these two elements. Service providers can also select optimized topological locations of Serving Gateways 410 within the network independent of the locations of MMEs 408 in order to reduce optimized bandwidth latencies and avoid concentrated points of failure.

As seen in FIG. 4B, the E-UTRAN (e.g., eNB) 412 interfaces with ULE 101 via LTE-Uu. The E-UTRAN 412 supports LTE air interface and includes functions for radio resource control (RRC) functionality corresponding to the control plane MME 408. The E-UTRAN 412 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 408, as a key control node, is responsible for managing mobility UE identifies and security parameters and paging procedure including retransmissions. The MME 408 is involved in the bearer activation/deactivation process and is also responsible for choosing Serving Gateway 410 for the UE 101. MME 408 functions include Non Access Stratum (NAS) signaling and related security. MME 408 checks the authorization of the UE 101 to camp on the service provider's Public Land Mobile Network (PLMN) and enforces ULE 101 roaming restrictions. The MME 408 also provides the control plane function for mobility between LTE and 2G/3G access networks with the S3 interface terminating at the MME 408 from the SGSN (Serving GPRS Support Node) 414.

The SGSN 414 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 408 and HSS (Home Subscriber Server) 416. The S10 interface between MMEs 408 provides MME relocation and MME 408 to MME 408 information transfer. The Serving Gateway 410 is the node that terminates the interface towards the E-UTRAN 412 via S1-U.

The S1-U interface provides a per bearer user plane tunneling between the E-UTRAN 412 and Serving Gateway 410. It contains support for path switching during handover between eNBs 43. The S4 interface provides the user plane with related control and mobility support between SGSN 414 and the 3GPP Anchor function of Serving Gateway 410.

The S12 is an interface between UTRAN 406 and Serving Gateway 410. Packet Data Network (PDN) Gateway 418 provides connectivity to the UE 101 to external packet data networks by being the point of exit and entry of traffic for the UE 101. The PDN Gateway 418 performs policy enforcement, packet filtering for each user, charging support, lawful interception and packet screening. Another role of the PDN Gateway 418 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 420 to Policy and Charging Enforcement Function (PCEF) in the PDN Gateway 418. The SGi interface is the interface between the PDN Gateway and the operator's IP services including packet data network 422. Packet data network 422 may be an operator external public or private packet data network or an intra operator packet data network, e.g., for provision of IMS (IP Multimedia Subsystem) services. Rx+ is the interface between the PCRF and the packet data network 422.

Figure 4C:
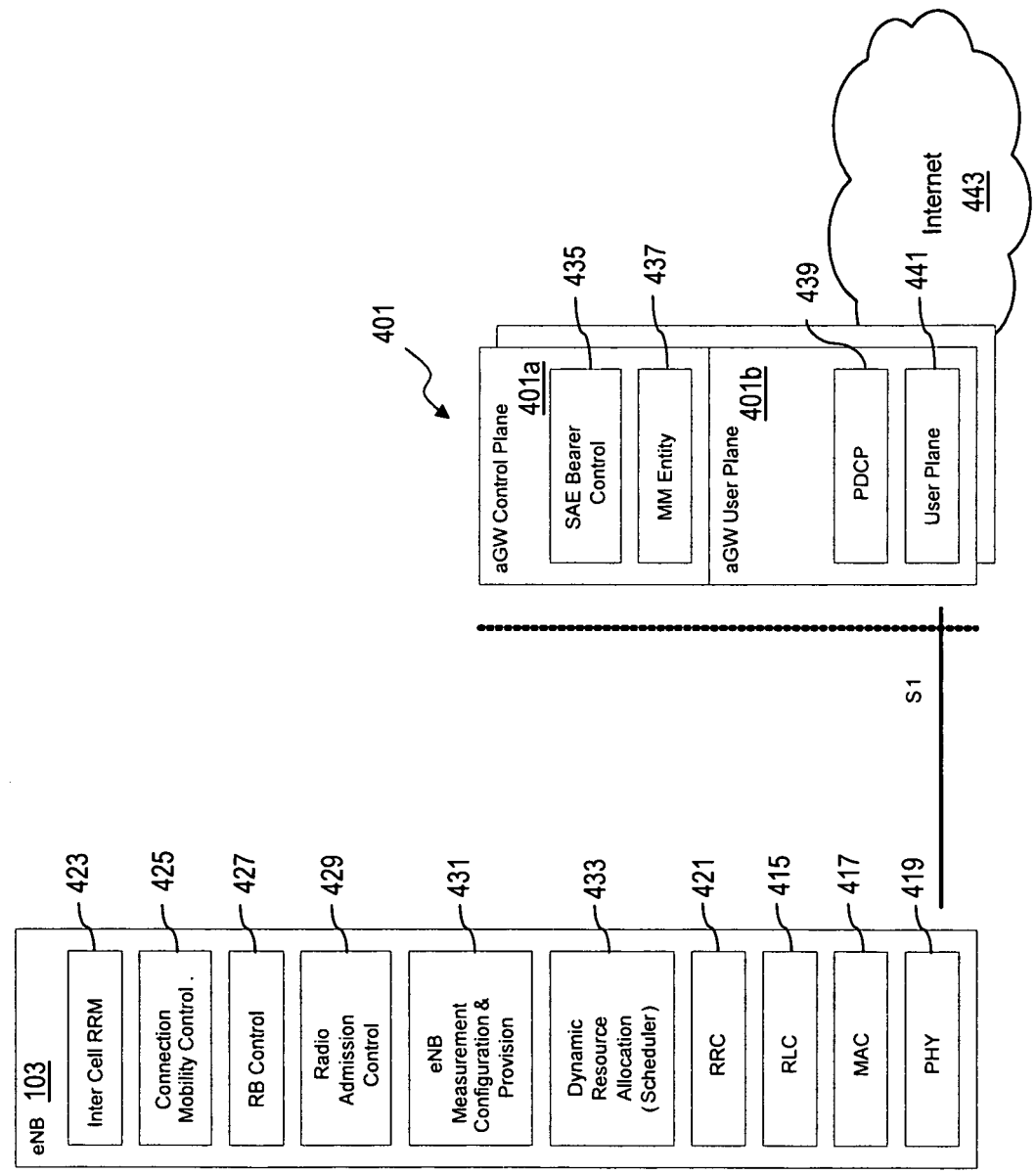

As seen in FIG. 4C, the eNB 43 utilizes an E-UTRA (Evolved Universal Terrestrial Radio Access) (user plane, e.g., RLC (Radio Link Control) 415, MAC (Media Access Control) 417, and PHY (Physical) 419, as well as a control plane (e.g., RRC 421)). The eNB 43 also includes the following functions: Inter Cell RRM (Radio Resource Management) 423, Connection Mobility Control 425, RB (Radio Bearer) Control 427, Radio Admission Control 429, eNB Measurement Configuration and Provision 431, and Dynamic Resource Allocation (Scheduler) 433.

The eNB 43 communicates with the aGW 401 (Access Gateway) via an S1 interface. The aGW 401 includes a User Plane 401a and a Control plane 401b. The control plane 401b provides the following components: SAE (System Architecture Evolution) Bearer Control 435 and MM (Mobile Management) Entity 437. The user plane 401b includes a PDCP (Packet Data Convergence Protocol) 439 and a user plane functions 441. It is noted that the functionality of the aGW 401 can also be provided by a combination of a serving gateway (SGW) and a packet data network (PDN) GW. The aGW 401 can also interface with a packet network, such as the Internet 443.

Figure 4D:
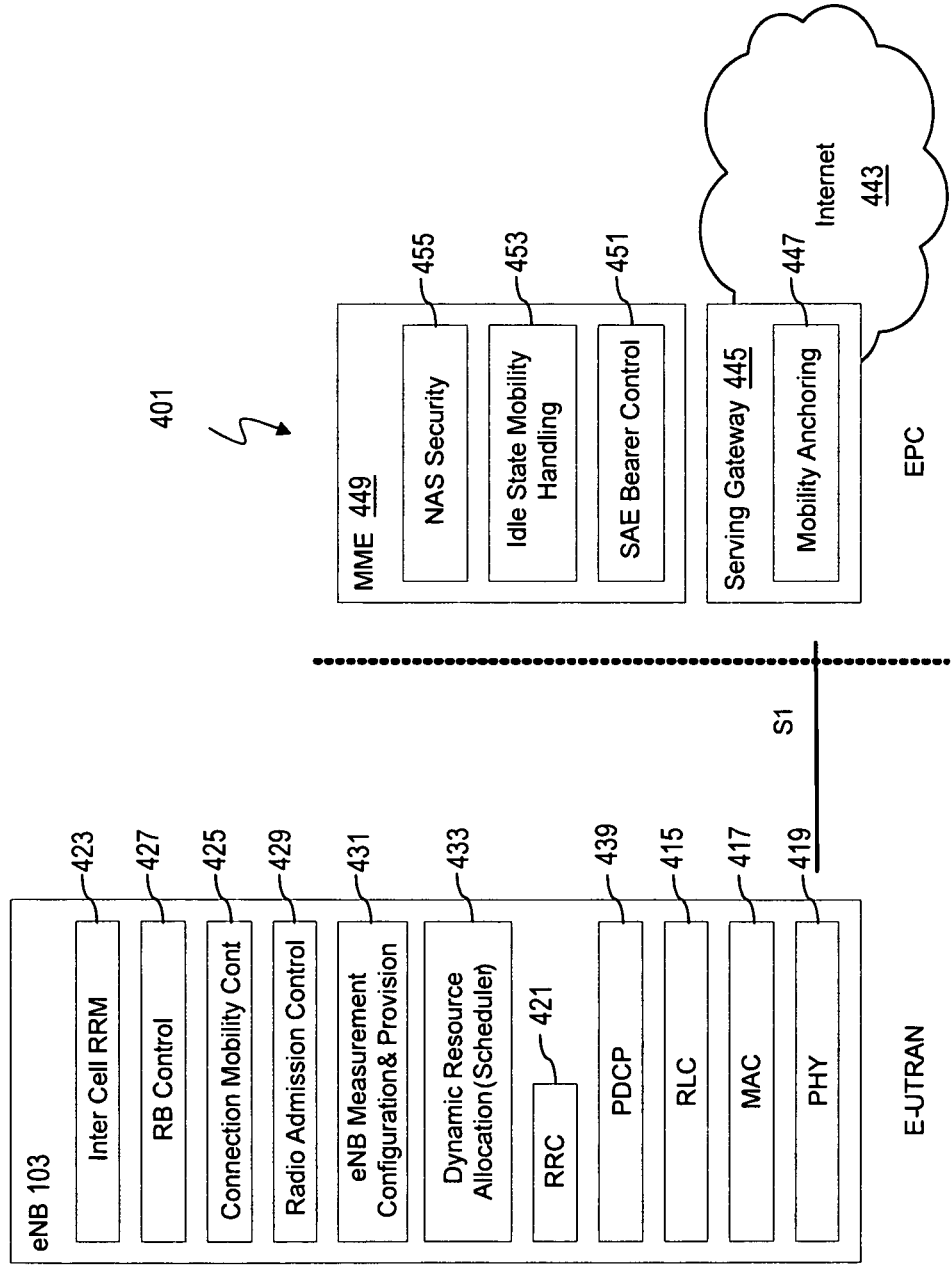

In an alternative embodiment, as shown in FIG. 4D, the PDCP (Packet Data Convergence Protocol) functionality can reside in the eNB 43 rather than the GW 401. Other than this PDCP capability, the eNB functions of FIG. 4C are also provided in this architecture.

In the system of FIG. 4D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 43 interfaces via the S1 to the Serving Gateway 445, which includes a Mobility Anchoring function 447. According to this architecture, the MME (Mobility Management Entity) 449 provides SAE (System Architecture Evolution) Bearer Control 451, Idle State Mobility Handling 453, and NAS (Non-Access Stratum) Security 455.

One of ordinary skill in the art would recognize that the processes for acknowledgement bundling may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 5:
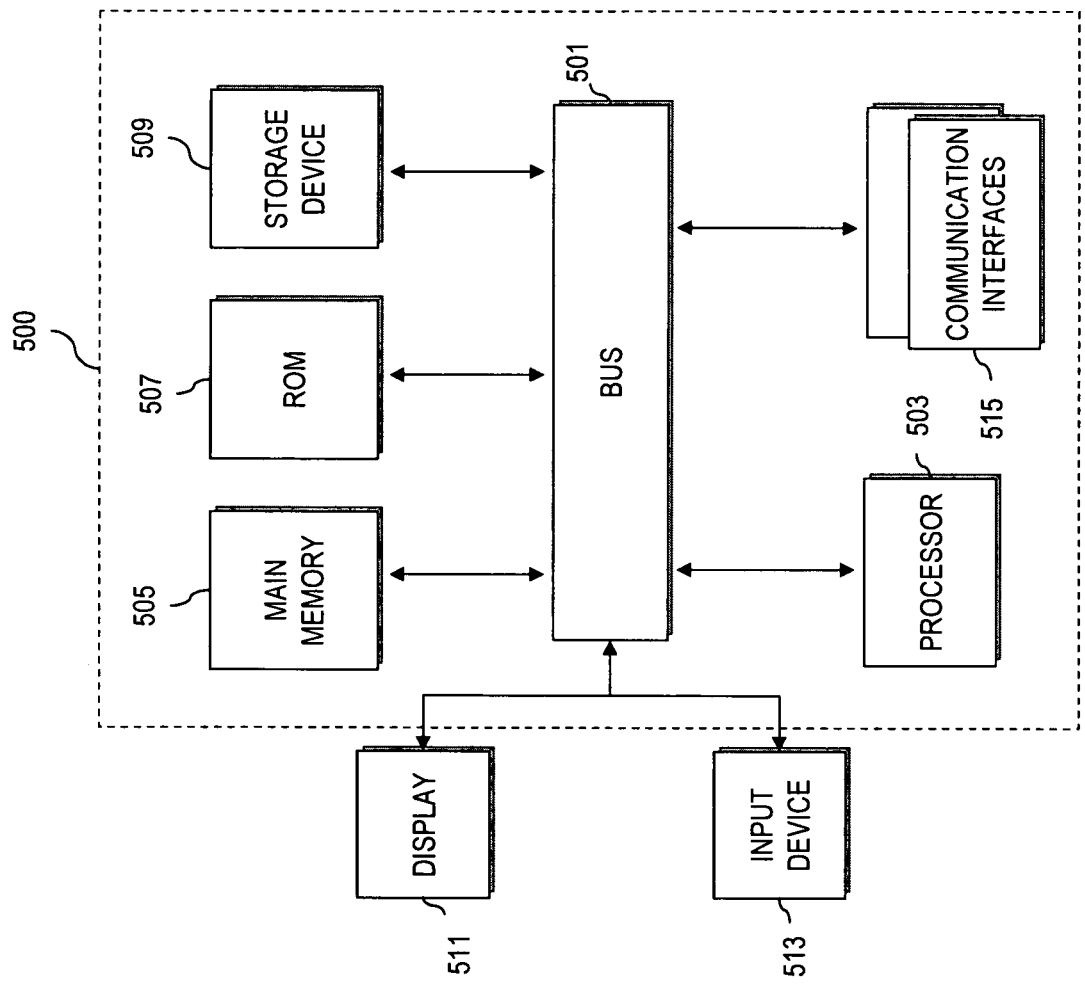
FIG. 5 is a diagram of hardware that can be used to implement an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled via the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
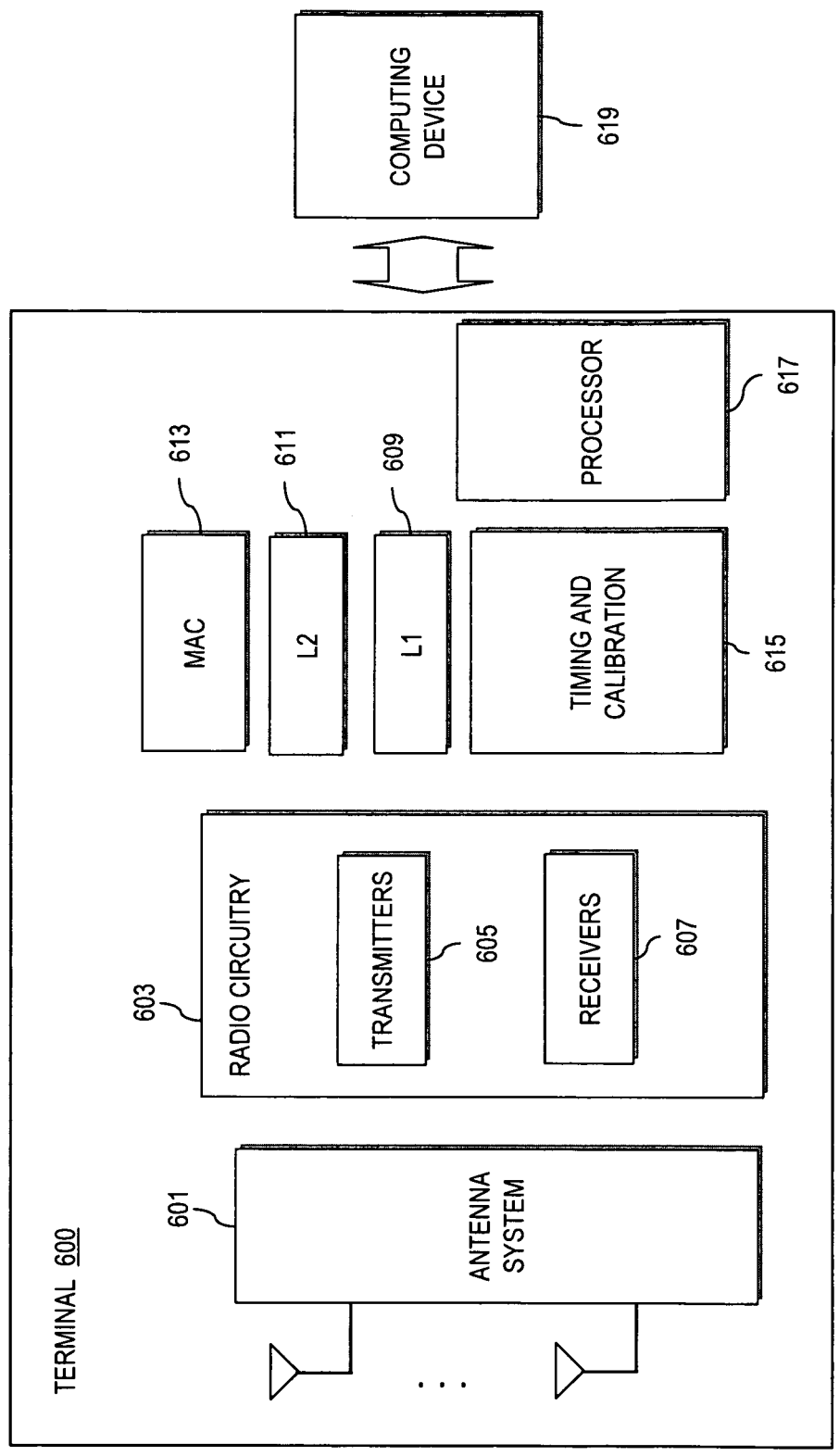
FIG. 6 is a diagram of exemplary components of a user terminal configured to operate in the systems of FIGS. 4A-4D, according to an embodiment of the invention.

FIG. 6 is a diagram of exemplary components of a user terminal configured to operate in the systems of FIGS. 4A-4D, according to an embodiment of the invention. A user terminal 600 includes an antenna system 601 (which can utilize multiple antennas) to receive and transmit signals. The antenna system 601 is coupled to radio circuitry 603, which includes multiple transmitters 605 and receivers 607. The radio circuitry encompasses all of the Radio Frequency (RF) circuitry as well as base-band processing circuitry. As shown, layer-1 (L1) and layer-2 (L2) processing are provided by units 609 and 611, respectively. Optionally, layer-3 functions can be provided (not shown). Module 613 executes all Medium Access Control (MAC) layer functions. A timing and calibration module 615 maintains proper timing by interfacing, for example, an external timing reference (not shown). Additionally, a processor 617 is included. Under this scenario, the user terminal 600 communicates with a computing device 619, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
dynamically scheduling one or more of subframes per bundling window by reusing an assignment index field, wherein the assignment index field has a value greater than or equal to number of previously assigned subframes within the bundling window, the bundling window defining a group of subframes for common acknowledgement;
setting the assignment index field according to m modulo x, wherein m and x are integers;
interleaving data of the subframes to provide decorrelation;
comparing a value of the assignment index field associated with a last received downlink grant modulo x with a total number of downlink grants prior to the last received downlink grant modulo x; and adding the value of the assignment index field associated with the last received downlink by x, if there are at least two identical assignment index field values in the bundling window, x being an integer.

2. The method according to claim 1, further comprising:

labeling the assignment index field for each assignment according to (Ceil (n/2)+K) modulo x, wherein n and x are integers, and K is a boolean value to indicate whether at least 2 subframes will be dynamic assigned in the subframes within the bundling window.

3. The method according to claim 2, wherein the assignment index field is a downlink assignment index field, and x equals 4.

4. The method according to claim 2, wherein a value of the assignment index field associated with a last received downlink grant is compared with a total number of downlink grants.

5. The method according to claim 4, wherein a predetermined number of downlink grants have been missed, and the dynamic scheduling is performed according to a maximum number of subframes associated with the bundling window.

6. An apparatus comprising:

at least one processor; and at least one memory including computer program code, the at least one memory and the computer program code configured to, with the at least one processor, cause the apparatus to perform at least the following:

dynamically schedule one or more of subframes per bundling window by reusing an assignment index field, wherein the assignment index field has a value greater than or equal to number of previously assigned subframes within the bundling window, the bundling window defining a group of subframes for common acknowledgement, set the assignment index field according to m modulo x, m and x being integers, interleave data of the subframes to provide decorrelation, compare a value of the assignment index field associated with a last received downlink grant modulo x with a total number of downlink grants prior to the last received downlink grant modulo x, and add the value of the assignment index field associated with the last received downlink by x, if there are at least two identical assignment index field values in the bundling window, x being an integer.

7. The apparatus according to claim 6, wherein the apparatus is further caused to:

label the assignment index field for each assignment according to (Ceil (n/2)+K) modulo x, wherein n and x are integers, and K is a boolean value to indicate whether at least 2 subframes will be dynamic assigned in the subframes within the bundling window.

8. The apparatus according to claim 7, wherein the assignment index field is a downlink assignment index field, and x equals 4.

9. The apparatus according to claim 7, wherein a value of the assignment index field associated with a last received downlink grant is compared with a total number of downlink grants.

10. The apparatus according to claim 9, wherein a predetermined number of downlink grants have been missed, and the the apparatus is further caused to:

dynamically schedule according to a maximum number of subframes associated with the bundling window.

* * * * *

UNITED STATES PATENT AND TRADEMARK OFFICE
CERTIFICATE OF CORRECTION

| | | |
|---|---|---|
| PATENT NO. | : 8,488,533 B2 | Page 1 of 1 |
| APPLICATION NO. | : 12/489988 | |
| DATED | : July 16, 2013 | |
| INVENTOR(S) | : Xiangguang Che et al. | |

It is certified that error appears in the above-identified patent and that said Letters Patent is hereby corrected as shown below:

On the title page item "(73) Assignee: Nokia Corporation, , Espoo (FI)"

Should read -- (73) Assignee: NOKIA SIEMENS NETWORKS, Espoo (FI) --

Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,488,533 B2  
APPLICATION NO. : 12/489988  
DATED : July 16, 2013  
INVENTOR(S) : Xiangguang Che et al.

Page 1 of 1

It is certified that error appears in the above-identified patent and that said Letters Patent is hereby corrected as shown below:

On the title page

"(73) Assignee: Nokia Corporation, , Espoo (FI)"

Should read -- (73) Assignee: NOKIA SIEMENS NETWORKS OY, Espoo (FI) --

This certificate supersedes the Certificate of Correction issued January 28, 2014.

Signed and Sealed this  
Thirteenth Day of May, 2014

Michelle K. Lee  
*Deputy Director of the United States Patent and Trademark Office*